United States Patent [19]
Bouchard et al.

[11] Patent Number: 5,898,798
[45] Date of Patent: Apr. 27, 1999

[54] REGION-BASED TEXTURE CODING AND DECODING METHOD AND CORRESPONDING SYSTEMS

[75] Inventors: Lionel Bouchard, Paris; Régine Askenatzis, Marseilles, both of France

[73] Assignee: U.S. Philips Corporation, New York, N.Y.

[21] Appl. No.: 08/734,006

[22] Filed: Oct. 18, 1996

[30] Foreign Application Priority Data

Oct. 18, 1995 [EP] European Pat. Off. ............... 95402325

[51] Int. Cl.⁶ ....................................................... G06K 9/48
[52] U.S. Cl. ........................... 382/242; 382/232; 382/248; 382/175
[58] Field of Search ................................... 382/232, 242, 382/166, 228, 248, 175; 348/416

[56] References Cited

U.S. PATENT DOCUMENTS 5,101,446  3/1992  Resnikoff et al. ....................... 382/248
5,671,294  9/1997  Rogers et al. ........................... 382/228

OTHER PUBLICATIONS

Mallat, "Theory for Multiresolution Signal Decomposition: The Wavelet Representation"—IEEE trans. Pattern Anal. Mach. Intel., vol. 11, No. 7—Jul. 1989—pp. 674–693.

"L'Analyse Par ondelettes", Yves Meyer, Stephane Jaffard et Olivier Rioul, Pour la Science, Sep. 1987, pp. 28–37.

"Image Coding Using Wavelet Transform", Marc Antonini, Michel Barlaud, Pierre Mathieu and Ingrid Daubechies, IEEE Transactions on Image Processing, vol. 1, No. 2, Apr. 1992, pp. 205–220.

Primary Examiner—Jose L. Couso
Assistant Examiner—Anh Hong Do
Attorney, Agent, or Firm—Laurie E. Gathman

[57] ABSTRACT

The invention relates to an image sequence coding method in which images are segmented and coded with respect to their contours and textures. The texture coding step is carried out by means of a new technique relying on a wavelet decomposition of the images, called quincunx bidimensional wavelet transform and adapted to a region-based coding scheme, for applications allowing to reach very low bit rates while keeping a good image quality.

4 Claims, 5 Drawing Sheets

REGION-BASED TEXTURE CODING AND DECODING METHOD AND CORRESPONDING SYSTEMS

BACKGROUND OF THE INVENTION

The present invention relates to a method of coding images of an image sequence comprising for each image the following steps:

(A) segmentation of said image into homogeneous regions;

(B) coding of the contours of said regions;

(C) coding of the textures of said regions. It also relates to a corresponding decoding method, and to systems for implementing said coding and decoding methods.

This invention finds applications in the field of very low bitrate video coding and is particularly attractive in relation to the emerging coding standard MPEG4 supporting new ways for communication, access and manipulation of digital audio-visual data.

Relatively few techniques are available to handle region-based texture coding. Polynomial approximation onto orthogonal basis allows to approximate a grey-level or color function within regions, but only the low frequencies are retrieved. In order to get the high frequencies, techniques dedicated to block-based schemes have been adapted to the case of regions and give good results, but annoying blocky effects appear at very low bitrates.

Since some fifteen years, a new mathematical tool has been proposed for the analysis and the synthesis of signals, especially when such signals correspond to sounds or images. This tool, called "wavelet transform" and described for instance in the magazine "Pour la Science", September 1987, pp. 28–37, "L'analyse par ondelettes", by Y. Meyer, S. Jaffard and O. Rioul, allows to represent any arbitrary signal as a superposition of wavelets. The wavelets are functions generated from a single one by dilations and translations and allow to decompose the concerned signal into different levels (each of which is further decomposed with a resolution adapted to this level).

This important mathematical tool has found applications in several technical fields, and particularly in image compression. The communication "Image coding using wavelet transform", IEEE Transactions on Image Processing, vol. 1, n°2, April 1992, pp. 205–220, describes such applications. As will be however shown, images are not processed in an isotropic way.

SUMMARY OF THE INVENTION

It is therefore a first object of the invention to propose a new region-based texture coding method, based on a wavelet decomposition of an image, but more efficient than previously known methods.

At this end the invention relates to a coding method as described in the preamble of the description and wherein said texture coding step includes a decomposition of the segmented image, comprising the following operations, performed for each of several successive levels of decomposition corresponding to a same number of iterations:

(a) building from the previous low-pass band segmentation mask two downsampled low-pass and high-pass segmentation masks, the low-pass band segmentation mask of the first iteration being the original segmented image itself;

(b) extending the low-pass band image along the boundaries of its regions;

(c) from these masks and extended signals, filtering and downsampling of the regions.

Such a method offers the advantage of providing a sharper analysis than the known techniques: the transform is isotropic, since no direction is privileged, and the spatial correlation between pixels in a neighborhood is more taken into account.

It is another object of the invention to propose a coding system for implementing this method.

At this end the invention relates to a system for coding images of an image sequence, comprising:

segmentation means for defining in each successive image homogeneous regions;

contour and texture coding means for respectively coding the contours and the textures of the regions of each successive image; wherein said texture coding means comprise, for a decomposition of each segmented image according to several successive levels, a processor carrying out in an iterative manner the following operations:

(a) building from the previous low-pass band segmentation mask two downsampled low-pass and high-pass segmentation masks, the low-pass band segmentation mask of the first iteration being the original segmented image itself;

(b) extending the low-pass band image along the boundaries of its regions;

(c) from these masks and extended signals, filtering and downsampling of the regions;

each iteration corresponding to each decomposition level.

It is another object of the invention to propose a method appropriate for decoding signals coded according to said coding method, and a corresponding decoding system.

At this end the invention relates both to a method of decoding signals corresponding to images that have been coded by means of a method such as indicated, said decoding method comprising the following steps:

(A) decoding of the coded signals corresponding to the contours of the regions;

(B) decoding of the coded signals corresponding to the textures of the regions;

(C) reconstruction of images corresponding to the images of the original sequence;

wherein said step of decoding the coded signals corresponding to the textures of the regions comprises the following operations, performed for each of several successive levels of reconstruction corresponding to a same number of iterations:

(a) building of downsampled segmentation masks;

(b) extension of the regions along their boundaries;

(c) upsampling and filtering;

and to a corresponding system comprising:

decoding means for decoding the coded signals corresponding to the contours of the regions;

decoding means for decoding the coded signals corresponding to the textures of the regions;

reconstruction means for the restitution of images corresponding to the original ones;

wherein said reconstruction means comprise, for said restitution, a processor carrying out in an iterative manner the following operations: building of segmentation masks, extension of the regions along their boundaries, upsampling and filtering.

BRIEF DESCRIPTION OF THE DRAWING

These and other aspects of the invention will be apparent from and elucidated with reference to the embodiments described hereinafter.

In the drawings.

DETAILED DESCRIPTION OF THE PREFERRED EMBODIMENTS

Figure 1:
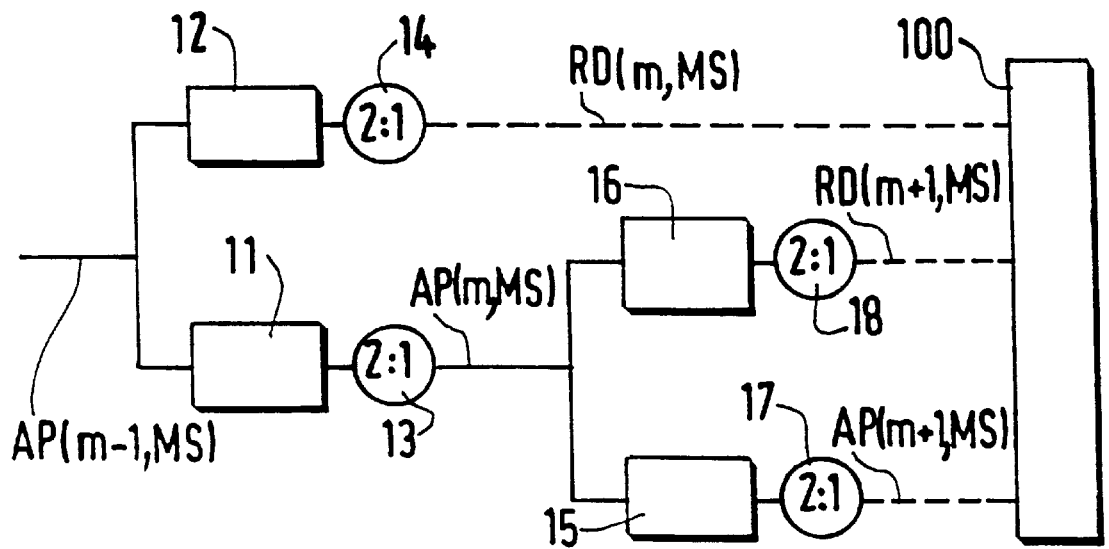
FIGS. 1 and 2 illustrate the principle of respectively an analysis process and a synthesis process when a monodimensional input signal is processed with the help of a wavelet transform.
Figure 2:
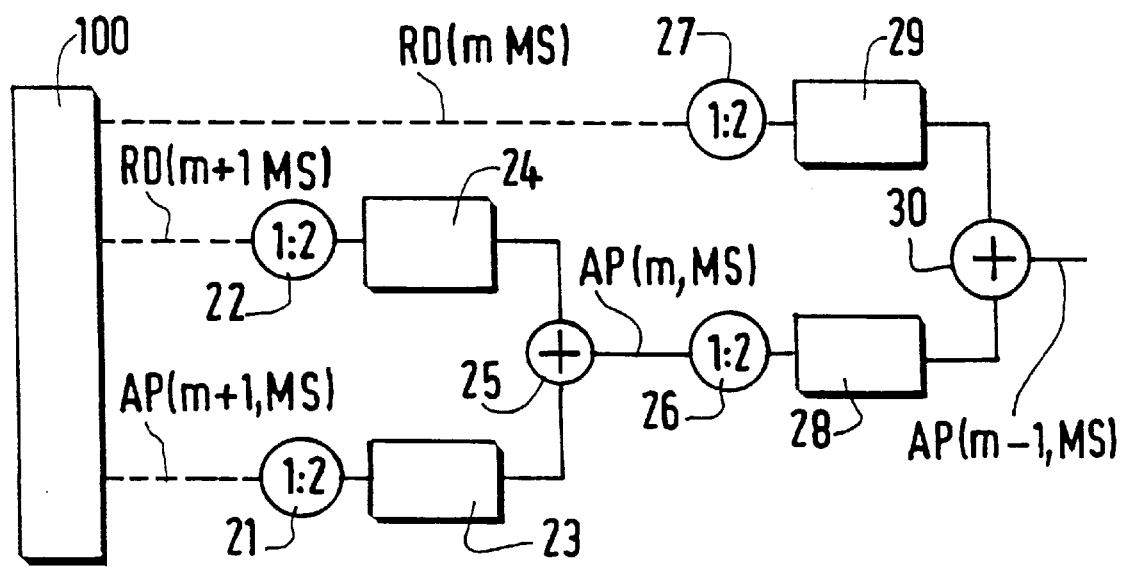

Basically, wavelet techniques relie on a space/frequency decomposition of images. A wavelet transform allows an input signal to be described by a set of subband signals each of which represents the input signal at a given resolution and in a particular frequency range. FIGS. 1 and 2 show filter banks for wavelet analysis and synthesis, illustrating respectively the analysis process before transmission and the synthesis process after transmission, in the conventional case of a monodimensional input signal MS processed by a wavelet transform.

During the analysis step, carried out at the transmitting (or storing) side, the approximation AP(m, MS) of the signal MS at a resolution $2^{-m}$ and the corresponding residual details RD(m, MS) can be obtained by filtering the previous approximation AP(m-1, MS) of this signal (at the resolution $2^{-(m-1)}$) respectively with a low-pass filter 11 and a high-pass filter 12, and by keeping, thanks to subsampling circuits 13 and 14 respectively associated, one sample over two. The same filtering process is applied to AP(m, MS), thanks to a low-pass filter 15, a high-pass filter 16, and associated subsampling circuits 17 and 18, in order to obtain the following approximation AP(m+1, MS) and the corresponding signal RD(m+1, MS), and so on. All the obtained signals are then sent for transmission to a transmission channel 100.

During the synthesis step, carried out at the receiving side, the approximation AP(m, MS) at the resolution $2^{-m}$ can be reconstructed by interpolating by a factor of two (in upsampling circuits 21 and 22) the signals AP(m+1, MS) and RD(m+1, MS), filtering these signals respectively by low and high-pass filters 23 and 24, and finally adding the resulting signals in an adder 25. Similarly, AP(m-1, MS) is obtained thanks to upsampling circuits 26 and 27, a low-pass filter 28, a high-pass filter 29, and an adder 30, and so on.

Figure 3:
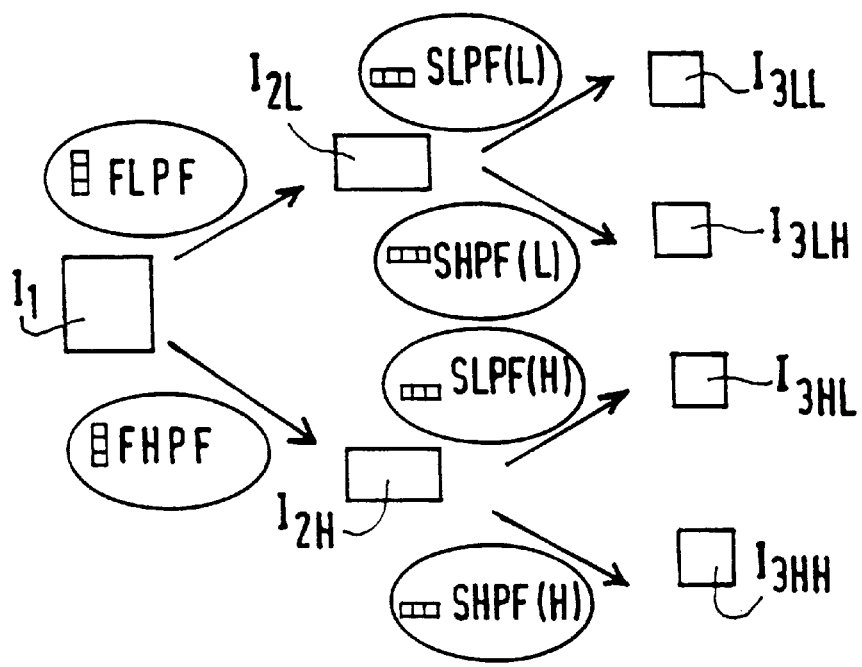
FIG. 3 illustrates how an image decomposition with the help of a dyadic bidimensional transform provides subimages of different resolutions and orientations.

When dealing with images as input signals, it has been proposed to extend the above-described monodimensional wavelet transform for images. Such an approach, called dyadic bidimensional wavelet transform, uses separable monodimensional filters applied on the rows and the lines of the images. As shown in FIG. 3 that illustrates an image decomposition with the help of said dyadic transform, a first low-pass filtering step (FLPF) and a first high-pass filtering step (FHPF) of the image $I_1$ (for example, a square image) and a subsequent subsampling on the rows of said image provide two rectangular images $I_{2L}$ and $I_{2H}$ with half lines. A second low-pass filtering (SLPF(L) and SLPF(H)) of these images $I_{2L}$ an $I_{2H}$ and a subsequent subsampling on the lines provide four square images $I_{3LL}$, $I_{3LH}$, $I_{3HL}$ and $I_{3HH}$ with half lines and half rows, and which are respectively a low-pass image, an image with vertical details, an image with horizontal details, and an image with diagonal details.

Figure 4:
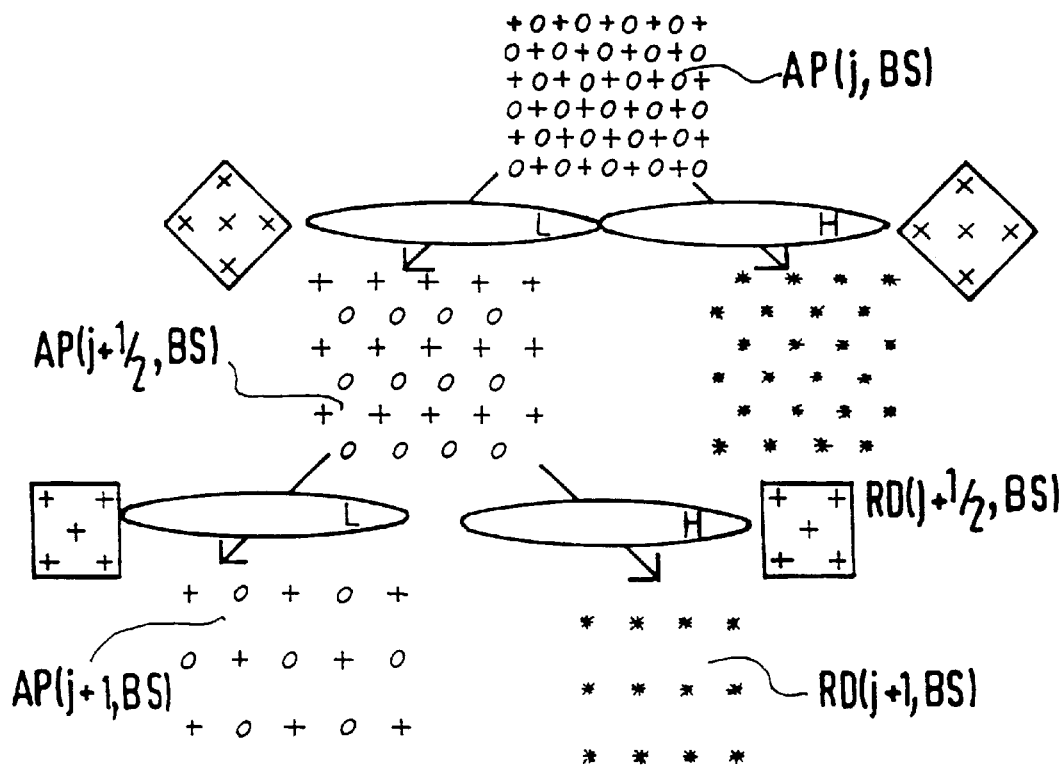
FIG. 4 shows sampling grids at different decomposition levels in the case of the so-called quincunx bidimensional wavelet transform.

Considering that this approach does not allow to process the image in an isotropic way since the filters are selective to the horizontal and vertical orientations, it is proposed to use bidimensional non-separable low and high-pass filters. This approach, called quincunx bidimensional wavelet transform, uses a scale factor of $\sqrt{2}$ (whereas it is 2 in the dyadic method) and allows to improve the accuracy of the analysis, since the number of resolution levels is double. As shown in FIG. 4, in which sampling grids at different decomposition levels can be seen, the subband images are defined on quincunx sampling grids. The low-pass filter L and the high-pass filter H are convolved with the image, shifting its center on the pixels depicted by crosses (respectively circles). From a rectangular grid (corresponding for instance to the level j, i.e. to the approximation AP(j, BS) of the signal now called bidimensional signal, or BS) to a quincunx grid, the low-pass filter L and the high-pass filter H are applied on a shifted sampling grid and, from a quincunx grid to a rectangular grid, the same filters (after a rotation over $\pi/4$) are then applied on a rectangular sampling lattice. Filtering and subsampling are in fact done simultaneously in order to save computational time.

Figure 5:
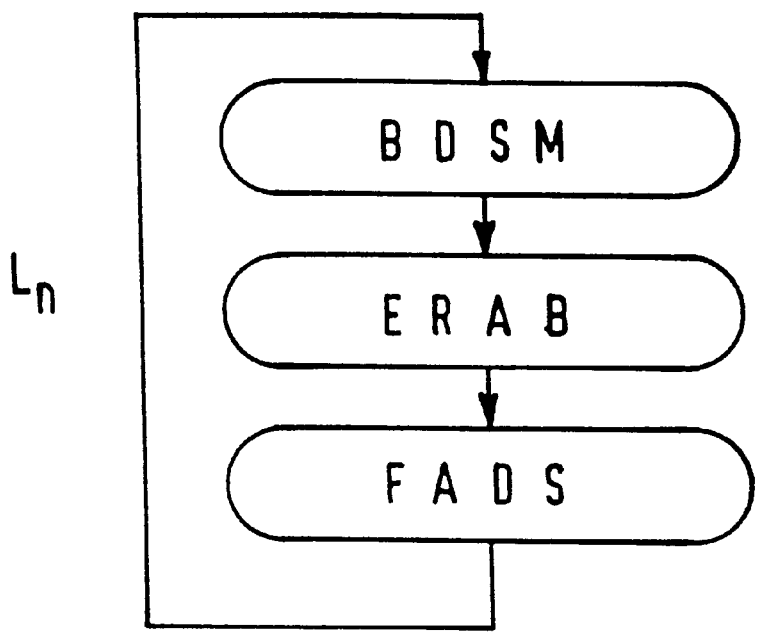
FIGS. 5 and 6 illustrate schematically the operations performed for the image decomposition (at the analysis side) and for the image reconstruction (at the synthesis side)
Figure 6:
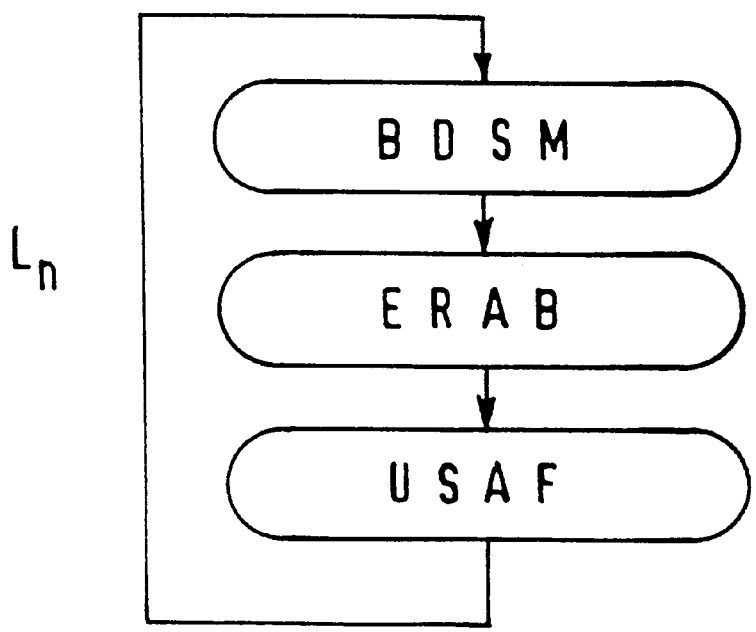

According to the invention, this improved approach is applied to region-based schemes, and FIGS. 5 and 6 illustrate schematically the operations then performed at the analysis (or transmitting, or storing) side and at the synthesis or receiving side respectively.

Before describing the analysis and synthesis process, it must be recalled that a region-based coding method will involve three main steps. First a segmentation step splits each original image into a set of adjacent objects which are homogeneous in terms of texture and/on motion. Then the contours of the regions are coded, using for example techniques such as a chain code method, described in the communication "Spiral image compression by on unrestricted chain coding method", Vth International Conference on Image Processing and its Applications, 4–6 July 1995, P. J. Nicholl and R. J. Millar, pp. 564–568. Finally the color of the regions is coded (texture coding).

This texture coding step then includes a decomposition of the segmented image, according to three successive operations (FIG. 5) which are performed at the analysis side, at each level of decomposition ($L_n$ in said Figures).

First, since the wavelet transform relies on a multiresolution analysis, two segmentation masks are built at each level of resolution, corresponding to the low-pass and high-pass subbands. For this operation of building of downsampled segmentation masks (or BDSM), two low-pass and high-pass segmentation masks are built from the previous low-pass band segmentation mask (at the first iteration of the decomposition, this low-pass band segmentation mask is the original segmentation mask itself, and the low-pass band image is the original image to be coded).

The regions having to be processed independently, the filtering and downsampling of the image will then be performed independently on each region, which involves that the boundaries of each region have to be extended in an efficient way in order to minimize the reconstruction errors along the image borders. For this second operation (extension of the regions along their boundaries, or ERAB), the low-pass band image is extended along the boundaries of each region.

According to the third operation, from the extended signals and masks, the regions are filtered and downsampled (FADS) in order to get two new low and high-pass subbands.

Concerning the whole process at the synthesis side (FIG. 6), three successive operations BDSM, ERAB, USAF are similarly performed at each level, only the third one (upsampling and filtering, or USAF) being different since it relies on upsampling and filtering operations done from the coarsest resolution to the initial one.

Figure 7:
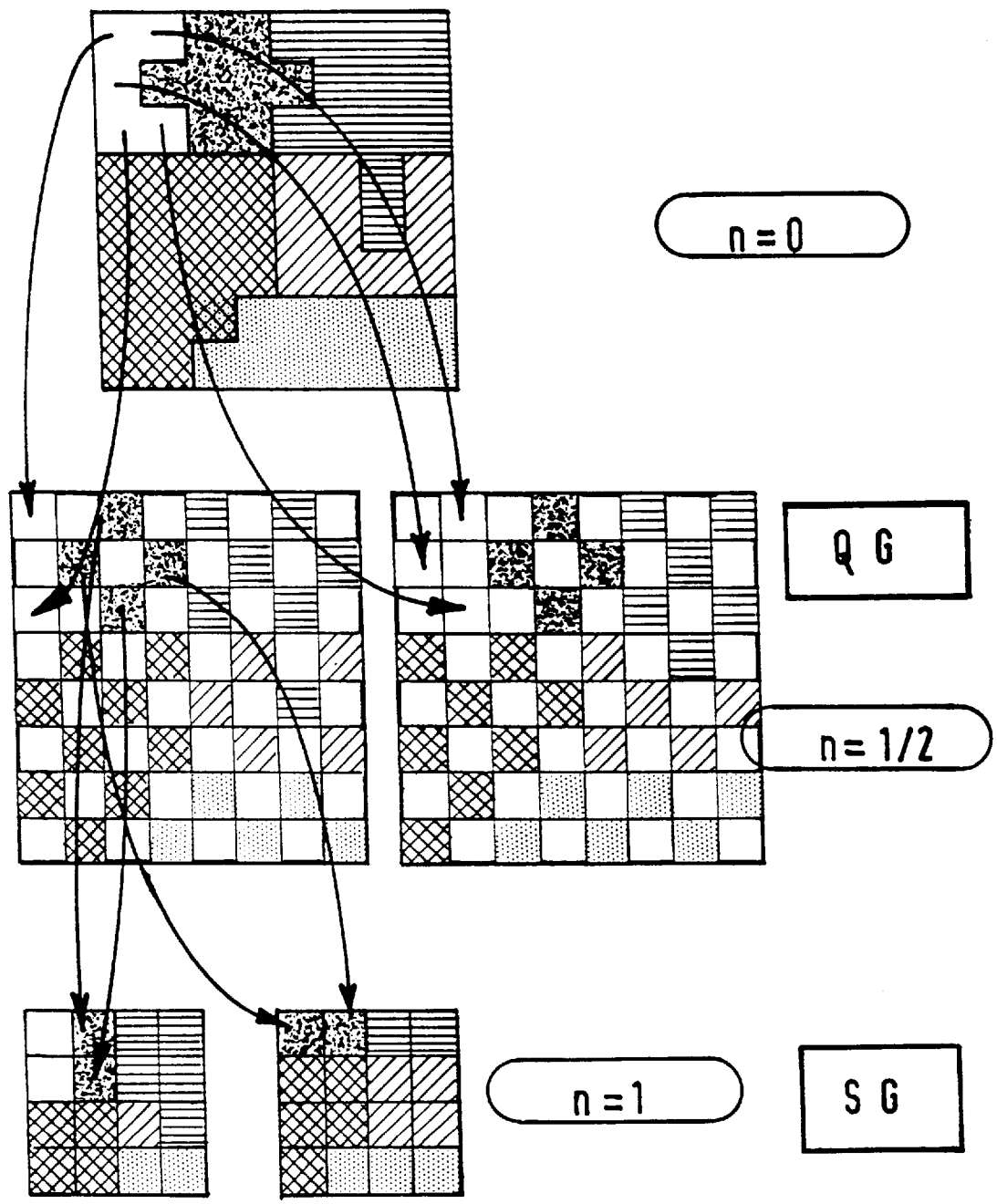
FIG. 7 illustrates the decomposition of the segmentation mask in the case of the region-based quincunx wavelet transform.

The way of performing the operation BDSM of building of the high-pass and low-pass segmentation masks is the following. In order to build these masks at each decomposition level, it is necessary to split each segmentation mask (included the original segmentation mask of the original image), or parent mask, into two segmentation masks (or children masks) corresponding to the low-pass and high-pass subbands. FIG. 7 shows respectively:

- at the decomposition level n=0, the segmentation mask of the original image
- at the decomposition level n–½, the segmentation masks (quincunx grids QG) of the low-pass and high-pass bands;
- at the decomposition level n=1, the segmentation masks (square grids SG) of the low-pass and high-pass bands (from the decomposition level n–½ to the decomposition level n, the performed transform is equivalent to a rotation over $\pi/4$ plus a dilation of $\sqrt{2}$).

Figure 8:
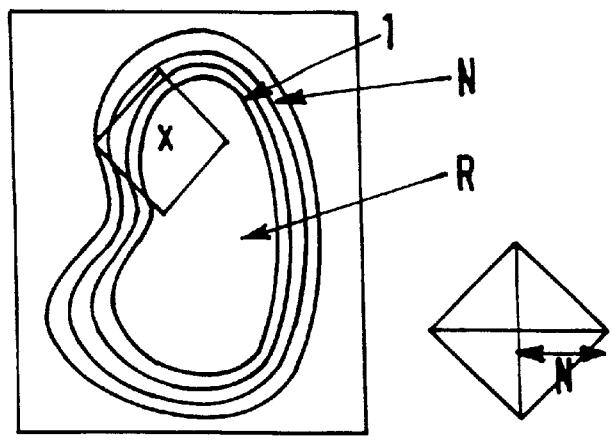
FIG. 8 illustrates the extension of the boundaries of a region, allowing to minimize the reconstruction errors along the image frontiers.
Figure 9:
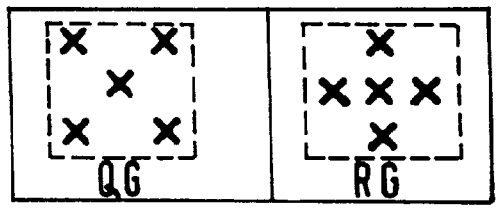
FIG. 9 shows the connectivity of pixels either on a quincunx grid or on a rectangular grid.
Figure 10:
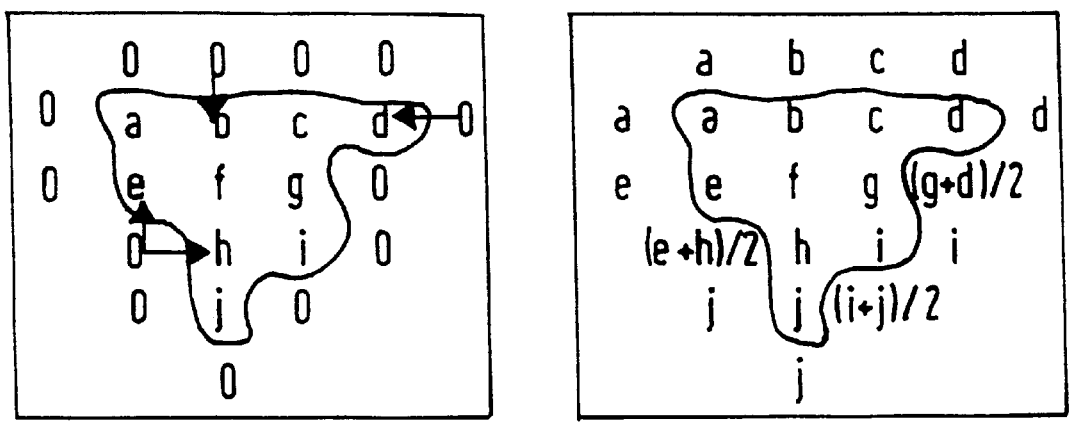
FIG. 10 illustrates an example of computation of an additional layer in the case of a rectangular grid.

The way of performing the operation ERAB of extension of the regions along their boundaries is the following. Once the splitting of the segmentation mask is achieved, the filtering and downsampling of the image are performed independently on each region. In order to minimize the reconstruction errors on the region borders, the extension of the boundaries is implemented, as illustrated in FIG. 8 that shows a region R and such an extension with N added layers around the region (where N is the half size of the filter). The same process is iterated to build each layer: at each iteration, the magnitude of the pixels of the extra layer are computed as the mean values of their neighboring pixels belonging to the region. As shown in FIG. 9, the connectivity is 4-neighbors whatever the grid is (quincunx grid QG or rectangular grid RG). FIG. 10 illustrates the computation of an extra layer in the case of a rectangular grid: in the left picture, the letters represent the pixel values of the initial region and the circles correspond to the pixels of the extra layer, while in the right picture the values of the pixels of the additional layer have been computed.

The present invention is not limited to this coding method from which modifications or improvements can be deduced without departing from the scope of the invention. For instance, it is clear that this coding method can be implemented in several manners, such as with the aid of wired electronic modules or, preferably, in the form of a coding system including a processor or a microprocessor that ensures the performance of series of instructions corresponding to the operations previously described in relation with the coding method and carried out within said electronic modules.

It is clear, also, that the invention similarly relates to a method of decoding signals corresponding to images of a sequence that have been coded by carrying out the above-described coding method. This decoding method comprises, in correspondance with the segmentation and coding steps, two decoding steps for decoding the coded signals corresponding respectively to the contours and to the textures of the regions of said images, and a reconstruction step for the restitution of images corresponding to the original ones. This decoding method, as the coding one, may be implemented in several manners, and especially by way of a decoding system including a processor or a microprocessor performing the instructions corresponding to the above-described steps.

We claim:

1. A method of coding images of an image sequence comprising for each image the following steps:
    (A) segmentation of said image into homogeneous regions;
    (B) coding of the contours of said regions; and
    (C) coding of the textures of said regions;
wherein said texture coding step includes a decomposition of the segmented image, comprising the following operations, performed for each of several successive levels of decomposition corresponding to a same number of iterations:
    (a) building from the previous low-pass band segmentation mask two downsampled low-pass and high-pass segmentation masks, rotating each image 45° and using a scale factor of $\sqrt{2}$ for each iteration, the low-pass band segmentation mask of the first iteration being the original segmented image itself;
    (b) extending the low-pass band image along the boundaries of its regions;
    (c) from these masks and extended signals, filtering and downsampling of the regions.

2. A method of decoding coded signals corresponding to images of a sequence that have been coded by way of a method according to claim 1, said decoding method comprising the following steps:
    (A) decoding of the coded signals corresponding to the contours of the regions;
    (B) decoding of the coded signals corresponding to the textures of the regions;
    (C) reconstruction of images corresponding to the images of the original sequence;
wherein said step of decoding the coded signals corresponding to the textures of the regions comprises the following operations, performed for each of several successive levels of reconstruction corresponding to a same number of iterations:
    (a) building of downsampled segmentation masks;
    (b) extension of the regions along their boundaries;
    (c) upsampling and filtering.

3. A system for coding images of an image sequence, comprising:
    segmentation means for defining in each successive image homogeneous regions;
    contour and texture coding means for respectively coding the contours and the textures of the regions of each successive image;
    wherein said texture coding means comprise, for a decomposition of each segmented image according to several successive levels, bidimensional non-separable low- and high-pass filters and a processor for carrying out in an iterative manner for several successive levels of decomposition the following operations:

(a) building from the previous low-pass band segmentation mask two downsampled low-pass and high-pass segmentation masks, rotating each image 45° and using a scale factor of √2 for each iteration, the low-pass band segmentation mask of the first iteration being the original segmented image itself;

(b) extending the low-pass band image along the boundaries of its regions;

(c) from these masks and extended signals, filtering and downsampling of the regions;

each iteration corresponding to each decomposition level.

4. A system for decoding coded signals corresponding to images of a sequence that have been coded in a coding system according to claim 3, said decoding system comprising:

decoding means for decoding the coded signals corresponding to the contours of the regions;

decoding means for decoding the coded signals corresponding to the textures of the regions;

reconstruction means for the restitution of images corresponding to the original ones;

wherein said reconstruction means comprise, for said restitution, a processor carrying out in an iterative manner the following operations: building of segmentation masks, extension of the regions along their boundaries, upsampling and filtering.

* * * * *